United States Patent
Butler et al.

(10) Patent No.: US 10,089,101 B2
(45) Date of Patent: Oct. 2, 2018

(54) UPDATING A SOFTWARE CONFIGURATION OF AN APPLIANCE

(71) Applicant: General Electric Company, Schenectady, NY (US)

(72) Inventors: Mark Allen Butler, Elizabethtown, KY (US); Robert Marten Bultman, Louisville, KY (US); Joseph Mark Brian, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 36 days.

(21) Appl. No.: 15/151,553

(22) Filed: May 11, 2016

(65) Prior Publication Data
US 2017/0329596 A1  Nov. 16, 2017

(51) Int. Cl.
*G06F 8/65* (2018.01)

(52) U.S. Cl.
CPC ..................... *G06F 8/65* (2013.01)

(58) Field of Classification Search
CPC ....................................................... G06F 8/65
USPC ........................................................ 717/172
See application file for complete search history.

(56) References Cited

U.S. PATENT DOCUMENTS

| | | | |
|---|---|---|---|
| 7,095,858 B2 | 8/2006 | Wagner et al. | |
| 8,155,320 B2 | 4/2012 | Takayama | |
| 2004/0054764 A1* | 3/2004 | Aderton | H04L 41/046 709/223 |
| 2006/0248162 A1 | 11/2006 | Kawasaki | |
| 2007/0169090 A1 | 7/2007 | Kang | |
| 2009/0144718 A1* | 6/2009 | Boggs | G06F 8/65 717/170 |
| 2009/0222806 A1* | 9/2009 | Faus | G06F 8/63 717/168 |
| 2009/0300593 A1* | 12/2009 | Faus | G06F 9/44505 717/168 |
| 2011/0173603 A1* | 7/2011 | Nakamura | G06F 8/66 717/173 |
| 2016/0117161 A1* | 4/2016 | Parthasarathy | H04L 67/06 717/171 |

* cited by examiner

*Primary Examiner* — Qing Chen
*Assistant Examiner* — Clint Thatcher
(74) *Attorney, Agent, or Firm* — Dority & Manning, P.A.

(57) ABSTRACT

Systems and methods for updating a software configuration of one or more control boards of an appliance are provided. For instance, a payload image file can be received. The payload image file can comprise a plurality of update images that include software configuration data for an appliance control board associated with an appliance group. Configuration data associated with a plurality of control boards present in a target appliance can be received. An appliance payload associated with the target appliance can be determined based at least in part on the configuration data. The appliance payload can include one or more update images to be associated with the target appliance.

19 Claims, 3 Drawing Sheets

UPDATING A SOFTWARE CONFIGURATION OF AN APPLIANCE

FIELD OF THE INVENTION

The present subject matter relates generally to appliances, and more particularly to updating appliance software configurations.

BACKGROUND OF THE INVENTION

In recent years, consumer appliances have become increasingly complex as new features tax the limits of appliance hardware and software. In particular, such new features can require multiple control board architectures within a single appliance. For instance, an appliance such as a refrigerator, washing machine, washer, dryer, microwave, cooktop, range, oven, icemaker, air conditioner, or other suitable appliance may include multiple control boards configured to control or regulate various aspects of the appliance. As appliance software complexity increases, so too does the need to efficiently manage the packaging and distribution of the software for any particular appliance, as well as to update appliance software in a post-factory environment.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a computer-implemented method of updating a software configuration of an appliance. The method includes receiving, by one or more computing devices, a payload image file. The payload image file includes a plurality of update images. Each update image includes software configuration data for an appliance control board associated with an appliance group. The method further includes obtaining, by the one or more computing devices, configuration data associated with a plurality of control boards present in a target appliance. The method further includes determining, by the one or more computing devices, an appliance payload associated with the target appliance based at least in part on the configuration data associated with the target appliance. The appliance payload includes one or more update images to be associated with the target appliance.

Another example aspect of the present disclosure is directed to a system for updating a software configuration of a target appliance. The system includes a programming entity in operative communication with a target appliance. The programming entity is configured to receive a payload image file. The payload image file includes a plurality of update images. Each update image includes software configuration data for an appliance control board associated with an appliance group to which the target appliance belongs. The programming entity is further configured to obtain configuration data associated with a plurality of control boards present in the target appliance. The programming entity is further configured to determine an appliance payload associated with the target appliance based at least in part on the configuration data associated with the target appliance. The appliance payload includes one or more update images to be associated with the target appliance.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
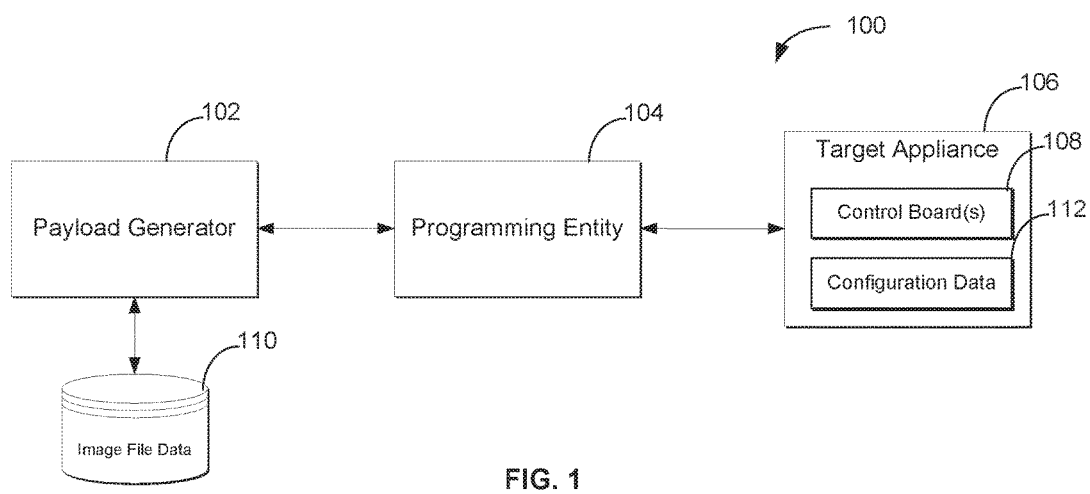
FIG. 1 depicts an example system for updating a software configuration of an appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to updating a software configuration of one or more control boards of an appliance. For instance, a payload image file can be received. The payload image file can include a plurality of update images. In particular, the payload image file can include update images for a plurality of control boards within an appliance group. Each update image can include software update data and metadata associated with an appliance control board. Configuration data associated with a target appliance within the appliance group can be received. The configuration data can specify the control boards present within the target appliance. An appliance payload can then be determined for the target appliance. The appliance payload can include one or more update images to be provided to the target appliance. For instance, the appliance payload can include update images for one or more control boards present in the appliance.

More particularly, an appliance can include one or more control boards configured to control one or more aspects of the appliance. A control board can be implemented within an appliance, and configured to control one or more tasks or operations associated with the appliance. For instance, a refrigerator appliance can include a control board to regulate a temperature within the refrigerator, a control board to regulate a temperature within a freezer portion of the refrigerator appliance, a control board to control aspects of a deli pan within the refrigerator appliance, a control board to control network communications within the refrigerator appliance, and/or other suitable control boards. An appliance group can include a plurality of appliances sharing one or more characteristics. For instance, an appliance group can include a plurality of refrigerator appliances, washing machine appliances, dryer appliances, dishwasher appliances, microwave appliances, cooktop appliances, oven appliances, or other suitable appliances. In some implementations, an appliance group can include a plurality of appliances that share at least one control board. In some implementations, an appliance group can include a plurality of appliances having no shared control boards.

A payload image file can include one or more update images for each appliance within an appliance group. More particularly, a payload image file can include update images for at least a subset of control boards found in the appliance group. In particular, the payload image file can include a concatenation of update images. For instance, the update images can include firmware images associated with each control board. The update images can further include embedded metadata associated with each control board. The metadata can include identifying data and other data respectively associated with each control board and/or each update image. For instance, the metadata can include a target control board address, a hardware identifier, an application image identifier, an image version, a response required attribute (e.g. positive or negative), and/or other suitable data associated with the update image and/or the control board.

In some implementations, the payload image file can further include an ignore list specifying one or more control boards within the appliance group that may be present in an appliance, but will not be updated. As will be discussed in greater detail below, the ignore list can indicate that a control board associated with the ignore list is not to be updated even though the control board is detected within an appliance.

In some implementations, the payload image file and/or the update images can be encrypted using one or more suitable encryption techniques. For instance, the payload image and/or the update images can be encrypted using a secure hash algorithm (SHA) technique, such as a SHA-256 technique.

The payload image file can be provided to a programming entity associated with a target appliance. For instance, the target appliance can be an appliance belonging to or otherwise included in the appliance group. In various implementations, the programming entity can be implemented within the target appliance, or the programming entity can be a separate and distinct device configured to interface or otherwise communicate with the target appliance. The payload image file can be downloaded to the programming entity, for instance, via a network.

The programming entity can be configured to discover the control boards present in the target appliance. For instance, the programming entity can receive identifying information associated with each control board. In some implementations, the identifying information can be provided to the programming entity by the target appliance in response to a board presence request provided to the target appliance by the programming entity. The discovered control boards can be checked against the payload image file to determine whether the target appliance is eligible for an update. For instance, the programming entity can determine whether each discovered control board has a corresponding update image in the payload image file. If each discovered control board has a corresponding update image in the payload image file, the target appliance is eligible for an update. If the target appliance includes one or more control boards that do not have a corresponding update image in the payload image file, the one or more control boards can be checked against the ignore list. If the one or more control boards are listed in the ignore list, the target appliance is eligible for an update. If at least one of the one or more control boards are not listed in the ignore list, the target appliance is not eligible for an update, and a fault can be declared by the programming entity. In this manner, for the target appliance to be eligible for an update, each control board present in the target appliance must have a corresponding update image in the payload image file, and if the target appliance includes one or more control boards that do not have corresponding update images in the payload image file, the one or more control boards must be on the ignore list.

Once it is determined that the target appliance is eligible for an update, the programming entity can obtain configuration data associated with each control board present in the target appliance. For instance, the programming entity can provide a configuration data request to the target appliance. In some implementations, the programming entity can provide a configuration data request to each control board present in the target appliance. In response to the configuration data request, configuration data associated with each control board in the target appliance can be provided to the programming entity. In some implementations, the received configuration data associated with a control board can act as a redundant confirmation of a board's presence.

The payload image file can be analyzed to determine each control board for which an update is required. As indicated above, each update image can include a response required attribute specifying whether an update is required for the control board associated with the update image. For instance, each update image can include a positive response required attribute indicating that an update for the corresponding control board is mandatory, or a negative response required attribute indicating that an update for the corresponding control board is optional. In this manner, the payload image file can be analyzed to identify the update images having positive response required attributes. The identified update images having positive response required attributes can be compared against the control boards present in the target appliance. If each control board having a corresponding update image with a positive response required attribute is present in the target appliance, the target appliance can be updated. If one or more control boards corresponding to update images having a positive response required attributes are not present in the target appliance, the programming entity can cease the update process and declare a fault. In this manner, each update image having a positive response required attribute must have a corresponding board present in the target appliance for an update of the target appliance to take place.

In some implementations, the programming entity can further determine whether each update image for which a response is required has a matching control board in the target appliance. For instance, subsequent to determining a presence of each control board for which a response is required, the programming entity can compare the configuration data associated with such control boards to the embedded metadata associated with the update images having a positive response required attribute to determine a match. Such determination can ensure that the control board matches the corresponding update image, such that the firmware image of the update image can be used to update the control board. If it is determined that an update image for which a response is required does not match a control board present within the target appliance, a fault can be declared and the update process can be ceased.

Once the control boards of the target appliance are matched to corresponding update images in the payload image file, an appliance payload can be determined. The appliance payload can include each update image to be provided to the target appliance for updating. For instance, the appliance payload can include update images for each control board to be updated in the target appliance. The programming entity can provide the appliance payload to the target appliance and/or to the corresponding control boards, and the corresponding control boards in the target appliance can be updated. Each control board receiving an update image can attempt to update. For instance, in implementations wherein the update images are encrypted (e.g., using a SHA-256 encryption technique), the update images can first be decrypted. In some implementations, the image version associated with the update image can be compared to a version of the firmware currently installed on the control board to determine if an update of the control board is necessary. For instance, if the image version associated with the update image specifies the same firmware version or a previous firmware version as the firmware currently installed on the control board, an update of the control board will not occur. In some implementations, if an update image to be provided to a control board does not match the control board, a fault can be declared and the update process can be ceased.

With reference now to the figures, example aspects of the present disclosure will be discussed in greater detail. For instance, FIG. 1 depicts an example system 100 for updating one or more control boards of an appliance. As shown, system 100 includes a payload generator 102, a programming entity 104 and a target appliance 106. Payload generator 102, programming entity 104 and/or target appliance 106 can include one or more controllers or processing devices configured to implement the systems and methods of the present disclosure. As used herein, "processing device" or "controller" may refer to one or more microprocessors, microcontroller, ASICS, or semiconductor devices and is not restricted necessarily to a single element. The controllers can be programmed to respectively operate payload generator 102, programming entity 104 and/or target appliance 106 by executing instructions stored in memory. The controllers may include, or be associated with, one or more memory elements such as for example, RAM, ROM, or electrically erasable, programmable read only memory (EEPROM).

Target appliance 106 can be any suitable appliance, such as a refrigerator, washing machine, dryer, dishwasher, microwave, oven, cooktop, range, icemaker, air conditioner, or any other suitable appliance. Target appliance 106 can include one or more control boards 108 configured to control or manage various aspects of target appliance 106. For instance, one or more control boards may be configured to control various components, operations, tasks, etc. of target appliance 106.

Payload generator 102 can be configured to generate a payload image file for an appliance group. An appliance group can be any suitable grouping of appliances. In some implementations, an appliance group can be a group of appliances that share one or more characteristics, configurations, and/or attributes. For instance, an appliance group can be an appliance platform, such as a platform of refrigerators, a platform of dishwashers, a platform of cooktops, etc. In some implementations, an appliance group can include a plurality of appliance models having varying configurations or capabilities. In some implementations, the appliance group can be selected based at least in part on one or more control boards within a plurality of appliances. For instance, an appliance group can be selected based at least in part on a number of common control boards found in the plurality of appliances.

A payload image file can be an image file that includes a plurality of update images. In particular, the payload image file can include update images corresponding to at least a subset of control devices within the appliance group. An update image can include a firmware image associated with a control board. The update image can further include embedded metadata associated with the control board and/or firmware image. For instance, the embedded metadata can include identifying metadata, such as a control board address, a hardware identifier, an image identifier, an image version, and/or other suitable identifying metadata. The embedded metadata can further include a response required attribute associated with the control board corresponding to the update image.

Payload generator 102 can generate a payload image file that includes each update image required to program any appliance within the appliance group. In particular, payload generator may access image file data 110 to generate a payload image file for the appliance group. Image file data 110 may include a plurality of update images associated with a plurality of appliance control boards. Image file data 110 can be included within payload generator 102 or can be stored in one or more separate and distinct locations, such as one or more databases. Payload generator 102 can obtain a plurality of update images from image file data 110 and concatenate the update images to generate the payload image file. The plurality of update images can be obtained based at least in part on the control boards present in the various appliances of the appliance group. As an example, an appliance group can contain various appliance configurations, each having one or more discrete control boards. A payload image file generated for such appliance group can include a plurality of update images sufficient to update the software on any such appliance configuration within the appliance group. In some implementations, payload generator can encrypt the payload image file (e.g. the update images of the payload image file) using one or more suitable encryption techniques (e.g. SHA-256 encryption algorithm).

Payload generator 102 can be configured to provide the generated payload image file to programming entity 104. In some implementations, payload generator 102 can communicate with programming entity 104 to determine an appropriate payload image file to provide. For instance, programming entity 104 can provide data indicative of target appliance 106 to payload generator 102, and payload generator 102 can access image file data 110 to provide to programming entity 104 a payload image file generated for an appliance group to which target appliance 106 belongs.

Programming entity 104 can be integrated in target appliance 106, or can be a separate and distinct device configured to interface or otherwise communicate with target appliance 106. In some implementations, payload generator 102 can be configured to provide the payload image file to programming entity 104 via a network, such as a local area network or a wide area network (e.g. Internet).

Programming entity 104 can be configured to communicate with target appliance 106 to determine an appliance payload to be used to update target appliance 106. For instance, programming entity 104 can be configured to discover the control boards 108 present in target appliance 106. For instance, programming entity 104 may detect the presence of the control boards 108 on an appliance bus associated with target appliance 106. Programming entity 104 can then compare the discovered control boards 108 in target appliance 106 to the payload image file to determine if target appliance 106 includes any control boards that are not represented by a corresponding update image in the payload image file. In implementations wherein the payload image file has been encrypted, programming entity 104 may be configured to decrypt the payload image file using one or more suitable decryption techniques. In some implementations, only an authorized programming entity can decrypt the payload image file and update a target appliance. As indicated above, if target appliance 106 has one or more control boards that are not represented in the payload image file, and are not listed in an ignore list associated with the payload image file, programming entity 104 can declare a fault and cease the update operation. For instance, such additional control board can indicate an error in the update operation and/or that target appliance is not included in the appropriate appliance group.

If it is determined that the control board configuration of target appliance 106 is satisfactory (e.g. every control board 108 of target appliance 106 is represented in the payload image file or is listed in the ignore list), the update operation can proceed, and configuration data 112 associated with control board(s) 108 can be obtained. In particular, programming entity 104 can interrogate or query target appliance 106 and/or control board(s) 108 for the configuration data 112 of the control boards to be updated (e.g. the control boards present in target appliance 106 that are not listed in the ignore list). In some implementations, configuration data 112 can include data corresponding to the embedded metadata associated with the update images of the payload image file. In particular, configuration data 112 can include a board address, hardware identification, image identification, currently installed image version, and/or other suitable configuration data. In this manner, configuration data 112 can be used to match the respective control boards to corresponding update images in the payload image file. In some implementations, the currently installed image version associated with configuration data 112 can be compared against the image version of the corresponding update image to determine if an update is necessary. If the currently installed image version of a control board is the same image version or a newer image version than the firmware image of the update image, the control board will not be updated.

Once the update images have been correlated or otherwise matched to the corresponding control boards (or vice versa), a response required attribute of the update images of the payload image file can be analyzed to determine one or more control boards that must be updated. As indicated, in some implementations, each update image of the payload image file can include a positive response required attribute or a negative response required attribute. In such implementations, the control boards represented by update images having a positive response required attribute must be updated. Programming entity 104 can analyze the payload image file and/or control board(s) 108 to determine if such control boards that require a response are present in target appliance 106. In some implementations, programming entity 104 can further analyze configuration data 112 to ensure that the control boards requiring a response have corresponding update images in the payload image file. If every control board requiring a response is present and/or has a corresponding update image, the update operation can continue. If one or more control boards requiring a response are absent from target appliance 106, programming entity 104 can declare a fault and cease the update operation.

If the control boards requiring a response are all present in target appliance 106, programming entity 104 can determine and/or generate an appliance payload. The appliance payload can include update images for each control board to be updated. The appliance payload can be provided to target appliance 106. In some implementations, update images of the appliance payload can be provided to the corresponding control boards via the appliance bus. The control boards can then be updated using the firmware images of the corresponding update images.

Figure 2:
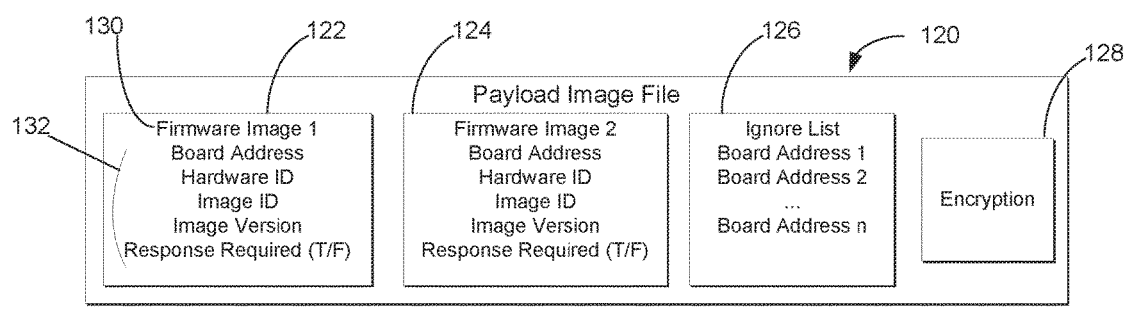
FIG. 2 depicts an example payload image file according to example embodiments of the present disclosure.

FIG. 2 depicts a block diagram of an example payload image file 120 according to example embodiments of the present disclosure. Payload image file 120 can be generated by a suitable payload generator, such as payload generator 102 of FIG. 1, or other suitable computing device(s). As shown, payload image file 120 includes update images 122 and 124, an ignore list 126, and an encryption algorithm 128. Update images 122 and 124 can include firmware images 130 and embedded metadata 132. Although only two update images are depicted in FIG. 2, it will be appreciated that various other suitable update images can be included in payload image file 120. In particular, payload image file 120 can include a number of update images sufficient to update software configurations of each appliance within a particular appliance group.

Firmware images 130 can include firmware or other data associated with one or more control aspects of a corresponding control board. Metadata 132 can include identifying information to facilitate a match or correlation between the update image and a corresponding control board within a target appliance in operative communication with an authorized programming entity in which payload image file 120 is stored. For instance, metadata 132 includes a board address, a hardware ID, an image ID, and an image version. Such identifying metadata can correspond to one or more control boards. For instance, an update image having a particular hardware ID may only be programmed into a control board having a matching hardware ID. As another example, an update image having a particular image ID may only be programmed into a control board having a matching image ID. Metadata 132 further includes a response required (T/F) attribute specifying whether an update of a corresponding control board is mandatory. For instance, a "T" response required attribute can correspond to a positive response required attribute wherein an update is mandatory, and a "F" response required attribute can correspond to a negative response required attribute wherein an update is optional.

Ignore list 126 can include a list of control boards that the programming entity can ignore when updating a target appliance. For instance, in some implementations, the ignore list can include a list of control boards that will never be updated. In this manner, if the target appliance has a control board that is not represented in payload image file 120, but is on the ignore list, the update operation can proceed. Encryption algorithm 128 can be any suitable encryption algorithm. For instance, in some implementations, encryption algorithm 128 can be a SHA-256 encryption algorithm.

Figure 3:
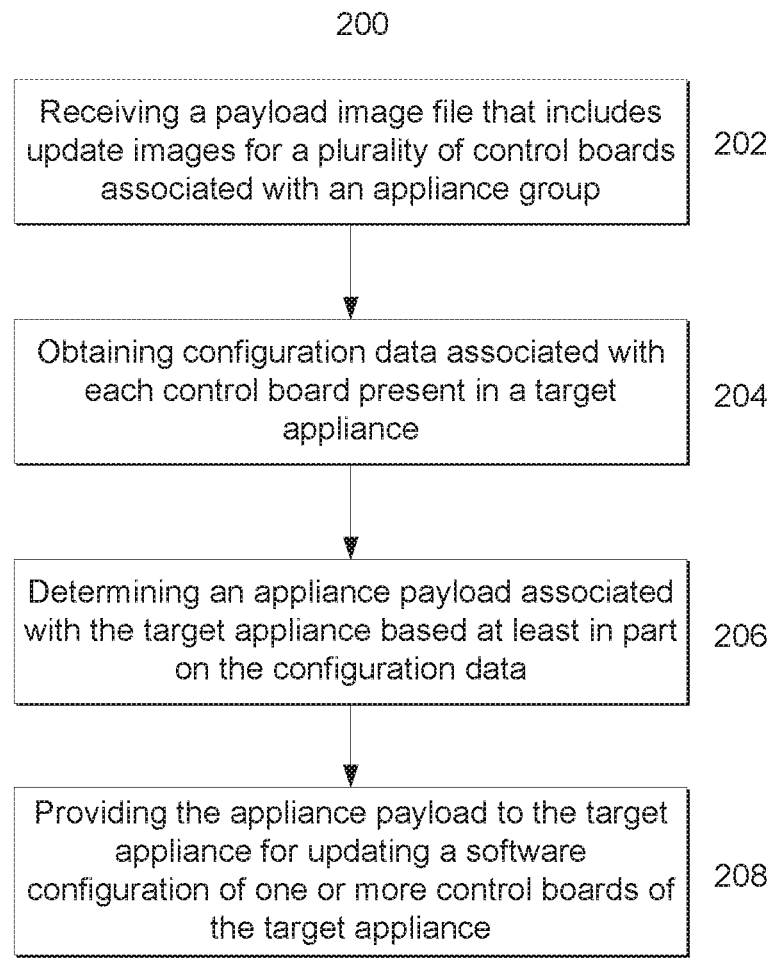
FIG. 3 depicts a flow diagram of an example method of updating a software configuration of an appliance according to example embodiments of the present disclosure.

FIG. 3 depicts a flow diagram of an example method (200) of updating software configuration of an appliance. Method (200) can be implemented by one or more computing devices, such as one or more of the computing devices depicted in FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving a payload image file that includes a plurality of update images. Each update image can include software configuration data (e.g. firmware image) for an appliance control board associated with an appliance group. In particular, the payload image file can include a concatenation of update images sufficient to update each appliance within the appliance group. The update images can further include metadata, such as identifying metadata or other metadata. In some implementations, the payload image file can be received based at least in part on a target appliance with which a programming entity is configured to interface. For instance, the payload image file can be associated with an appliance group to which the target appliance belongs.

At (204), method (200) can include obtaining configuration data associated with a plurality of control boards present in the target appliance. For instance, the configuration data can include data identifying data associated with the respective control boards. For instance, in some implementations, the configuration data can include a board address, a hardware identification, an image identification, a currently installed image version, and/or other information.

At (206), method (200) can include determining an appliance payload associated with the target appliance. The appliance payload can include one or more update images. In particular, the appliance payload can include data indicative of the update images corresponding to the control boards to be updated on the target appliance. For instance, the appliance payload can include at least a subset of the update images of the payload image file.

In some implementations, the appliance payload can be determined by matching or otherwise correlating one or more update images of the payload image file to a corresponding control board in the target appliance. Such correlation can be determined, for instance, based at least in part on the identifying metadata of the update images and/or the configuration data of the target appliance control boards.

At (208), method (200) can include providing the appliance payload to the target appliance. The control boards for which update images were received can then update a firmware or other software configuration based at least in part on the receive update images of the appliance payload.

Figure 4:
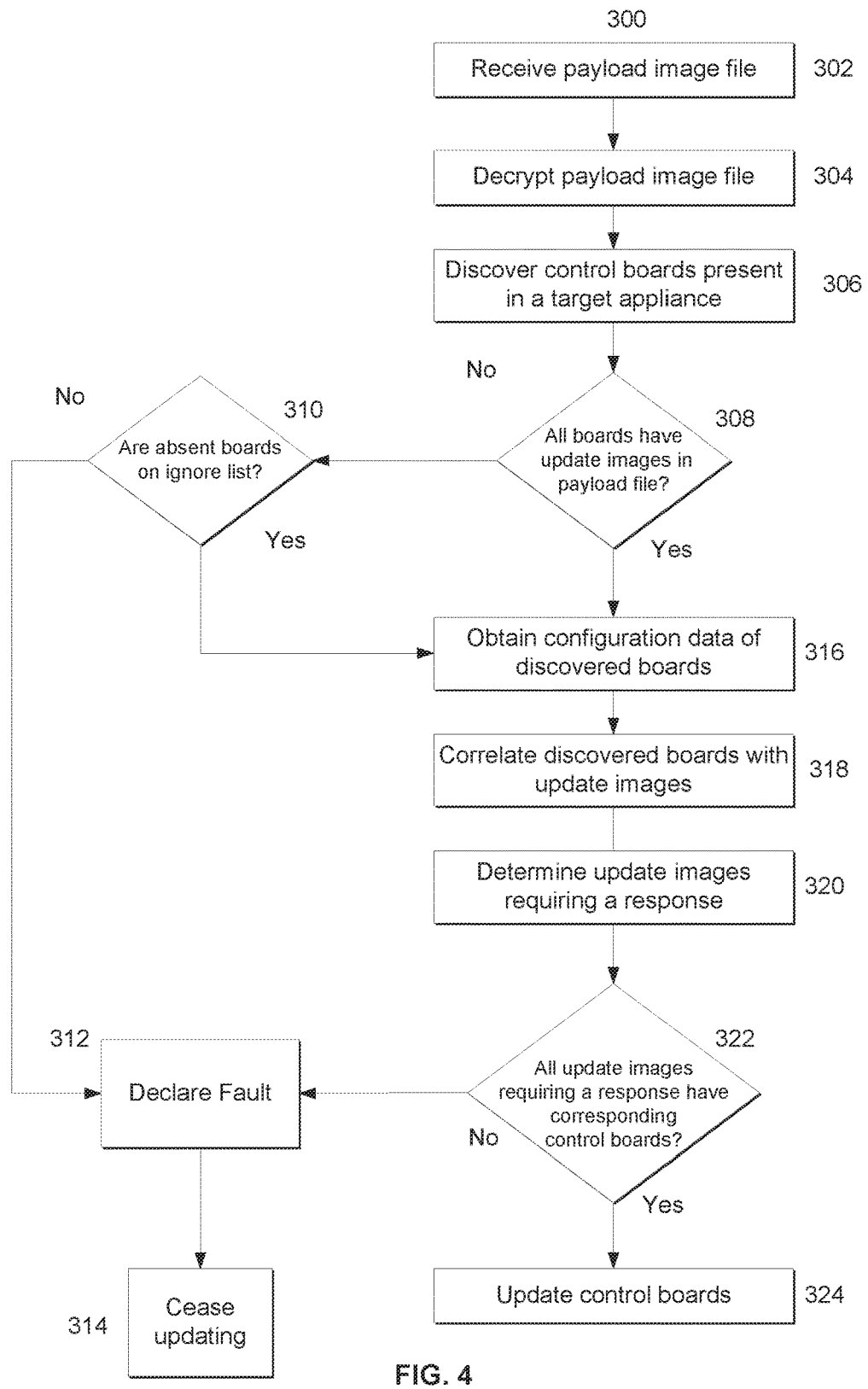
FIG. 4 depicts a flow diagram of an example method of updating a software configuration of an appliance according to example embodiments of the present disclosure.

FIG. 4 depicts a flow diagram of an example method (300) of updating a software configuration of a target appliance according to example embodiments of the present disclosure. Method (300) can be implemented by one or more computing devices, such as one or more of the computing devices depicted in FIG. 1. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving a payload image file. At (304), method (300) can include decrypting the payload image file. In some implementations, if the payload image file cannot be decrypted and/or if the data associated with the payload image file cannot be verified, a fault can be declared, and the updating operation can cease.

At (306), method (300) can include discovering one or more control boards present in a target appliance. For instance, in some implementations, the presence of the control boards can be discovered via an appliance bus of the target appliance.

At (308), method (300) can include determining whether each discovered control board has a corresponding update image in the payload image file. For instance, the update images can be compared to the discovered control boards to determine whether each control board is represented by an update image in the payload image file.

If the one or more boards are not represented by an update image in the payload image file, such one or more absent boards can be compared against an ignore list. In particular, at (310), method (300) can include determining if the absent boards (e.g. the control boards not represented in the payload image file) are listed in the ignore list. If one or more absent boards are not listed in the ignore list, at (312), method (300) can include declaring a fault, and at (314), method (300) can include ceasing the updating operation.

If each absent board is listed in the ignore list, at (316), method (300) can include obtaining configuration data associated with the discovered control boards. For instance, a configuration data request can be provided to the target appliance and/or to the discovered control boards, and target appliance can provide the configuration data associated with the discovered control boards to the requesting entity in response to the request.

At (318), method (300) can include correlating the discovered control boards with an update image in the payload image file. For instance, the correlation can be determined based at least in part on the metadata associated with the update images and the configuration data associated with the control boards. As indicated above, in some implementations, control boards having up-to-date installed firmware images relative to the image version of the firmware image in the update image can be excluded from the update operation. In this manner, such control boards will not be updated.

At (320), method (300) can include determining whether any update images require a response. For instance, determining whether any update images require a response can include determining whether any update images have a positive response required attribute. The control boards corresponding to the update images having a positive response required attribute can be determined to be control boards to receive an update. In some implementations, a presence of each corresponding control board can be determined based at least in part on the response required attributes of the update images.

At (322), method (300) can include determining whether each update image requiring a response has a corresponding control board present in the target appliance. If each update image requiring a response has a corresponding present control board, at (324), method (300) can include updating the control boards. For instance, as indicated above, an appliance payload can be determined and provided to the target appliance for use in updating of the software configuration of the control boards.

Referring back to (322), if one or more update images requiring a response do not have a corresponding control board, method (300) can return to (312) and a fault can be declared.

It will be appreciated that the control methods depicted in FIGS. 3 and 4 are described for illustrative purposes only. It will be further appreciated that various other software configuration updating techniques can be used without deviating from the scope of the present disclosure. In particular, various suitable software configuration update techniques according to example embodiments of the present disclosure can include any suitable combination of operations found in method (300), method (400), and/or in various other implementations or embodiments described in the present disclosure. In addition, although the embodiments of the present disclosure were described with respect to appliances and appliance groups, it will be appreciated that such embodiments can be applied to updating control boards associated with various other suitable computing devices or components.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of updating a software configuration of an appliance;
   receiving, by one or more computing devices, a payload image file, the payload image file comprising an ignore list and a plurality of update images, each update image comprising software configuration data for an appliance control board associated with an appliance group;
   obtaining, by the one or more computing devices, configuration data associated with a plurality of control boards present in a target appliance;
   determining, by the one or more computing devices, an appliance payload associated with the target appliance based at least in part on the configuration data associated with the target appliance, the appliance payload comprising one or more update images to be associated with the target appliance, wherein the ignore list specifies one or more control boards that are not to receive an update;
   determining whether a control board of the plurality of control boards is not represented by an update image in the payload image file and is not represented in the ignore list;
   in response to determining that a control board of the plurality of control boards is not represented by an update image in the payload image file and is not represented in the ignore list, ceasing an update operation; and
   in response to determining that a control board of the plurality of control boards is represented by an update image in the payload image file or is represented in the ignore list, providing the appliance payload to the target appliance.

2. The computer-implemented method of claim 1, further comprising:
   determining whether all control boards of the plurality of control boards are not represented by update images in the payload image file and are not represented in the ignore list;
   in response to determining that all control boards of the plurality of control boards are not represented by update images in the payload image file and are not represented in the ignore list, ceasing an update operation; and
   in response to determining that all control boards of the plurality of control boards are represented by update images in the payload image file or are represented in the ignore list, providing the appliance payload to the target appliance.

3. The computer-implemented method of claim 1, wherein each update image of the payload image file further comprises metadata associated with the update image, the metadata comprising identifying information associated with the update image.

4. The computer-implemented method of claim 3, wherein the identifying information comprises a board address, a hardware identification, an image identification, and an image version associated with the control board.

5. The computer-implemented method of claim 3, further comprising correlating, by the one or more computing devices, one or more control boards present in the target appliance with an update image based at least in part on the configuration data and the metadata associated with the control boards.

6. The computer-implemented method of claim 5, wherein determining, by the one or more computing devices, an appliance payload associated with the target appliance comprises determining the appliance payload associated with the target appliance based at least in part on the correlation of each of the one or more control boards present in the target appliance with an update image.

7. The computer-implemented method of claim 3, wherein the metadata further comprises a positive response required attribute or a negative response required attribute for the control board, wherein a positive response required attribute indicates that an update for the control board is mandatory, and a negative response required attribute indicates that an update for the control board is optional.

8. The computer-implemented method of claim 7, further comprising determining, by the one or more computing devices, whether each image having a positive response required attribute has a corresponding appliance control board present in the target appliance.

9. The computer-implemented method of claim 8, wherein determining, by the one or more computing devices, whether each image having a positive response required attribute has a corresponding appliance control board present in the target appliance comprises determining, by the one or more computing devices that one or more update images having a positive response required attribute do not have a corresponding appliance control board present in the target appliance.

10. The computer-implemented method of claim 9, further comprising declaring, by the one or more computing devices, a fault associated with the target appliance.

11. The computer-implemented method of claim 7, wherein determining, by the one or more computing devices, whether each image having a positive response required attribute has a corresponding appliance control board present in the target appliance comprises determining, by the one or more computing devices that each update image having a positive response required attribute has a corresponding appliance control board present in the target appliance.

12. The computer-implemented method of claim 11, further comprising providing, by the one or more computing devices, the appliance payload to the target appliance.

13. The computer-implemented method of claim 1, wherein the appliance group comprises a plurality of appliances, each having one or more control boards.

14. The computer-implemented method of claim 10, wherein the payload image file comprises update images for each control board in each appliance in the appliance group.

15. A system for updating a software configuration of a target appliance, the system comprising:
 a programming entity in operative communication with a target appliance comprising a plurality of control boards, the programming entity configured to:
 receive a payload image file, the payload image file comprising an ignore list and a plurality of update images, the ignore list specifying one or more control boards that are not to receive an update, each update image comprising software configuration data for an appliance control board associated with an appliance group to which the target appliance belongs;
 obtain configuration data associated with the plurality of control boards present in the target appliance;
 determine an appliance payload associated with the target appliance based at least in part on the configuration data associated with the target appliance, the appliance payload comprising one or more update images to be associated with the target appliance;
 determine whether a control board of the plurality of control boards is not represented by an update image in the payload image file and is not represented in the ignore list;
 in response to determining that a control board of the plurality of control boards is not represented by an update image in the payload image file and is not represented in the ignore list, cease an update operation; and
 in response to determining that a control board of the plurality of control boards is represented by an update image in the payload image file or is represented in the ignore list, provide the appliance payload to the target appliance.

16. The system of claim 15, wherein the programming entity is further configured to:
 determine whether all control boards of the plurality of control boards are not represented by update images in the payload image file and are not represented in the ignore list;
 in response to determining that all control boards of the plurality of control boards are not represented by update images in the payload image file and are not represented in the ignore list, cease an update operation; and
 in response to determining that all control boards of the plurality of control boards are represented by update images in the payload image file or are represented in the ignore list, provide the appliance payload to the target appliance.

17. The system of claim 15, wherein each update image of the payload image file further comprises metadata associated with the update image, the metadata comprising identifying information associated with the update image.

18. The system of claim 17, wherein the programming entity is further configured to correlate one or more control boards present in the target appliance with an update image based at least in part on the configuration data and the metadata associated with the update images.

19. The system of claim 15, wherein each update image of the payload image file further comprises a response required attribute indicating whether an update of a control board corresponding to the update image is mandatory.

* * * * *